United States Patent
Endo (10) Patent No.: US 12,459,470 B2
(45) Date of Patent: Nov. 4, 2025

(54) DRIVING SUPPORT APPARATUS

(71) Applicant: TOYOTA JIDOSHA KABUSHIKI KAISHA, Toyota (JP)

(72) Inventor: Kota Endo, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 18/458,477

(22) Filed: Aug. 30, 2023

(65) Prior Publication Data

US 2024/0109521 A1 Apr. 4, 2024

(30) Foreign Application Priority Data

Sep. 29, 2022 (JP) .................. 2022-156203

(51) Int. Cl.
| | |
|---|---|
| *B60T 7/22* | (2006.01) |
| *G06V 20/56* | (2022.01) |
| *G06V 20/58* | (2022.01) |
| *G06V 20/64* | (2022.01) |

(52) U.S. Cl.
CPC .............. *B60T 7/22* (2013.01); *G06V 20/582* (2022.01); *G06V 20/584* (2022.01); *G06V 20/588* (2022.01); *G06V 20/64* (2022.01); *B60T 2210/32* (2013.01); *B60T 2220/04* (2013.01); *G06V 2201/08* (2022.01)

(58) Field of Classification Search
CPC .............. B60T 7/22; B60T 7/12; B60T 8/321
See application file for complete search history.

(56) References Cited

U.S. PATENT DOCUMENTS

| | | | |
|---|---|---|---|
| 6,571,768 B1 * | 6/2003 | Nishiyama | ............ B60W 10/18 123/492 |
| 8,355,851 B2 | 1/2013 | Inoue et al. | |
| 8,370,040 B2 | 2/2013 | Inoue et al. | |
| 8,417,430 B2 | 4/2013 | Saeki | |

(Continued)

FOREIGN PATENT DOCUMENTS

| | | | |
|---|---|---|---|
| JP | 2012162221 A | * | 8/2012 |
| JP | 2017-43171 A | | 3/2017 |
| JP | 2022-065285 A | | 4/2022 |

OTHER PUBLICATIONS

Translation of JP 2012162221 (Year: 2012).*

*Primary Examiner* — Kenneth J Malkowski
(74) *Attorney, Agent, or Firm* — Sughrue Mion, PLLC (57) ABSTRACT

A driving support apparatus includes a surrounding sensor capable of acquiring surrounding information on a three-dimensional object around a vehicle and a road marking ahead of the vehicle, and a vehicle state sensor capable of acquiring vehicle state information on multiple types of vehicle states in response to driving operation by a driver, including an AP operation amount in response to the driver's AP operation as one of the vehicle states. The apparatus further includes a control unit configured to execute deceleration assist control to assist deceleration when a predetermined start condition is satisfied, and to cancel the deceleration assist control when a cancel condition which is satisfied when the AP operation is performed during execution of the deceleration assist control is satisfied. When the cancel condition is satisfied, the control unit reduces the braking force based on the surrounding information and the vehicle state information.

6 Claims, 6 Drawing Sheets

(56) References Cited

U.S. PATENT DOCUMENTS

| | | |
|---|---|---|
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2002/0091479 A1* | 7/2002 | Maruko .................. B60T 7/22 701/96 |
| 2017/0057355 A1 | 3/2017 | Oikawa et al. |
| 2019/0295419 A1 | 9/2019 | Tosa et al. |
| 2022/0032883 A1* | 2/2022 | Ito ............................ B60T 7/12 |
| 2022/0118981 A1 | 4/2022 | Nishimoto |
| 2024/0182005 A1* | 6/2024 | Goto .............. B60W 30/18109 |

* cited by examiner

DRIVING SUPPORT APPARATUS

BACKGROUND OF THE INVENTION

1. Field of the Invention

The present invention relates to a driving support apparatus capable of executing deceleration assist control that assists deceleration of a vehicle by automatically applying braking force to the vehicle.

2. Description of the Related Art

JP2022-065285A discloses a driving support apparatus that cancels the deceleration assist control when an accelerator pedal operation by a driver of a vehicle is detected during execution of the deceleration assist control. This driving support apparatus reduces a deceleration control amount (braking force) faster when an accelerator pedal operation amount is large than when the accelerator pedal operation amount is small, and thereby cancels the deceleration assist control.

According to the driving support apparatus of JP2022-065285A, there is a possibility that the driver may feel uncomfortable when the deceleration assist control is canceled. That is, when the driver's pedal operation becomes rough due to fatigue or the like, there may be a case where the accelerator pedal operation amount becomes larger than the driver's intention.

For example, in a scene where a need for acceleration is relatively low, a case where the driver intends to step on an accelerator pedal lightly but steps on it deeply, or a case where the driver steps on the accelerator pedal mistakenly instead of a brake pedal can be mentioned. In such cases, in spite of the driver expecting that the deceleration assist control will be canceled gradually or that the deceleration assist control will continue, the deceleration control amount decreases quickly (that is, a deceleration feeling decreases quickly), and thus there is a possibility that the driver may feel uncomfortable.

SUMMARY OF THE INVENTION

The present invention has been made to address the above-mentioned problems. That is, one of the objects of the present invention is to provide a driving support apparatus capable of reducing a possibility of a driver feeling uncomfortable when canceling deceleration assist control based on accelerator pedal operation by the driver.

The driving support apparatus according to the present invention (hereinafter referred to as a "present invention apparatus") includes a surrounding sensor, a vehicle state sensor, and a control unit. The surrounding sensor is capable of detecting a three-dimensional object present around a vehicle and a road marking in front of the vehicle, and acquiring information on the detected three-dimensional object and road marking as surrounding information. The vehicle state sensor is capable of detecting multiple types of vehicle states in response to driving operation by a driver of the vehicle, and acquiring information on the detected vehicle states as vehicle state information. This vehicle state sensor includes an accelerator pedal operation amount in response to an accelerator pedal operation by the driver as one of the detected vehicle states. The control unit is configured to execute deceleration assist control that assists deceleration of the vehicle by automatically applying braking force to the vehicle when a predetermined start condition is satisfied, and cancel the deceleration assist control by decreasing the braking force so that a deceleration of the vehicle becomes zero when a cancel condition is satisfied, the cancel condition being satisfied when the accelerator pedal operation is performed during execution of the deceleration assist control. When the cancel condition is satisfied, the control unit is configured to decrease the braking force based on the surrounding information and the vehicle state information.

The present invention apparatus is configured to reduce the braking force based on the surrounding information and the vehicle state information when canceling the deceleration assist control due to satisfaction of the cancel condition (the condition that is satisfied when the accelerator pedal operation is performed by the driver during execution of the deceleration assist control). Therefore, it is possible to appropriately reduce the braking force compared to a configuration that reduces the braking force based only on the accelerator pedal operation amount. As a result, it is possible to reduce a possibility of the driver feeling uncomfortable when the deceleration assist control is canceled even if the accelerator pedal operation amount increases unintentionally contrary to a driver's intention.

In one aspect of the present invention, when the cancel condition is satisfied, the control unit is configured to decrease the braking force linearly.

In one aspect of the present invention, when the cancel condition is satisfied, the control unit is configured to calculate an acceleration necessity index, which indicates a degree of necessity of accelerating the vehicle, based on the surrounding information and the vehicle state information. The control unit is configured to set, when the acceleration necessity index is low, an absolute value of a decrease slope of the braking force smaller than a predetermined reference slope regardless of a value of the accelerator pedal operation amount, and set, when the acceleration necessity index is high, the absolute value of the decrease slope larger when the accelerator pedal operation amount is large than when the accelerator pedal operation amount is small.

According to this configuration, in a scene where a need for acceleration is low, the braking force decreases relatively gently regardless of the value of the accelerator pedal operation amount. On the other hand, in a scene where the need for acceleration is high, the braking force decreases relatively steeply when the accelerator pedal operation amount is large compared to when the accelerator pedal operation amount is small. Therefore, it is possible to realize vehicle behavior that better matches with a driver's sense.

In one aspect of the present invention, the vehicle state sensor includes, as the detected vehicle state, each of a steering angle in response to a steering operation by the driver and an operating state of a direction indicating operator corresponding to a direction indicating operation by the driver. The control unit is configured to determine that the acceleration necessity index is low when an expected time for the vehicle to reach a preceding vehicle, or a signal or a road sign requiring the vehicle to stop is less than or equal to a predetermined first time threshold, a magnitude of the steering angle is less than or equal to a predetermined first steering angle threshold, and the direction indicating operator is not operated.

According to this configuration, the acceleration necessity index is determined to be low when the need for acceleration is low, and thus reliability of the acceleration necessity index can be ensured.

In one aspect of the present invention, the vehicle state sensor includes, as the detected vehicle state, each of a steering angle in response to a steering operation by the driver and an operating state of a direction indicating operator corresponding to a direction indicating operation by the driver. The control unit is configured to determine that the acceleration necessity index is high in any one of following cases, that is, when an expected time for the vehicle to reach a preceding vehicle, or a signal or a road sign requiring the vehicle to stop exceeds a predetermined second time threshold, which is a first case; when there is no preceding vehicle, a magnitude of the steering angle is less than or equal to a predetermined first steering angle threshold, and the direction indicating operator is not operated, which is a second case; or when there is a preceding vehicle, the magnitude of the steering angle exceeds a predetermined second steering angle threshold larger than the first steering angle threshold, and the direction indicating operator is operated in a direction corresponding to the steering operation, which is a third case.

According to this configuration, the acceleration necessity index is determined to be high when the need for acceleration is high, and thus the reliability of the acceleration necessity index can be ensured.

In the above description, in order to facilitate understanding of the invention, the symbols used in the embodiments are enclosed in parentheses corresponding to the configuration requirements of the invention used in the embodiments. However, each configuration requirement of the invention is not limited to the embodiment defined by the symbol.

DESCRIPTION OF THE EMBODIMENT

Figure 1:
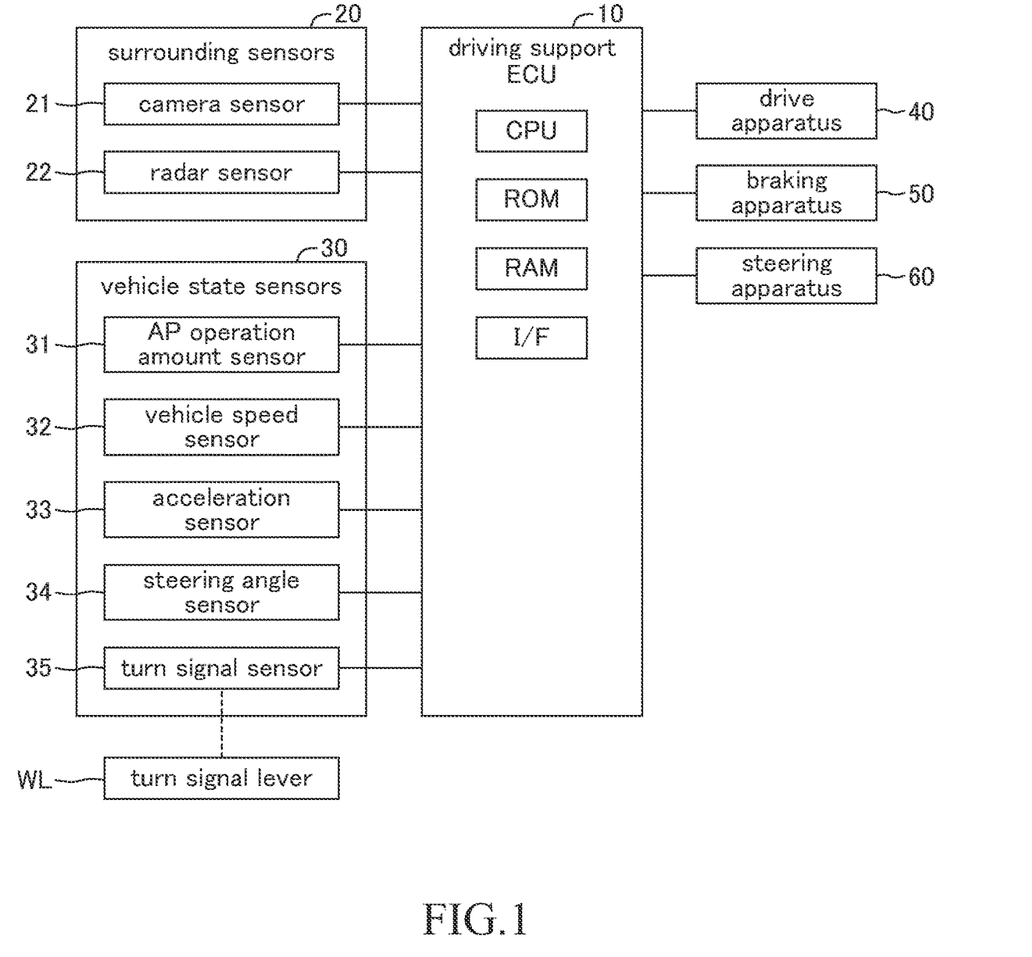
FIG. 1 is a schematic configuration diagram of a driving support apparatus according to an embodiment of the present invention.

Hereinafter, a driving support apparatus (hereinafter referred to as a "present embodiment apparatus") according to an embodiment of the present invention will be described with reference to the drawings. The present embodiment apparatus is mounted on a vehicle. As shown in FIG. 1, the present embodiment apparatus includes a driving support ECU 10, and surrounding sensors 20, vehicle state sensors 30, a drive apparatus 40, a braking apparatus 50 and a steering apparatus 60, each of which being connected to the driving support ECU 10. The driving support ECU 10 has a microcomputer as a main component. The microcomputer includes a CPU, ROM, RAM, interfaces (I/F), and the like, and the CPU realizes various functions by executing instructions (programs, routines) stored in the ROM. Hereinafter, a vehicle equipped with the present embodiment apparatus will be referred to as an "own vehicle".

The driving support ECU 10 is configured to acquire signals output from the sensors 20 and 30 every time a predetermined interval elapses and control the apparatuses 40, 50, and 60 based on the acquired signals. Hereinafter, the driving support ECU 10 is also simply referred to as "ECU 10".

The surrounding sensors 20 include a camera sensor 21 and a radar sensor 22. The camera sensor 21 is installed on a back surface of an inner mirror of the own vehicle. The camera sensor 21 captures an image of a scenery ahead of the own vehicle and detects a three-dimensional object present in front of the own vehicle based on the captured image data. The three-dimensional objects include a stationary object and a moving (movable) object. The stationary objects are, for example, a signal (traffic signal), a road sign, and structures (a guardrail, a curb, and a median strips, etc.). The moving object is, for example, another vehicle. When a three-dimensional object is detected, the camera sensor 21 calculates a relative relationship between the own vehicle and the three-dimensional object (relative position and relative speed of the three-dimensional object with respect to the own vehicle). In particular, when the detected three-dimensional object is a signal, the camera sensor 21 extracts a signal located ahead of the own vehicle from among the detected signals and identifies a type of light display (typically a color of the light or an arrow signal) of the extracted signal by applying a known image processing to the extracted signal.

Furthermore, the camera sensor 21 detects a road marking ahead of the own vehicle based on the image data. Road markings include a road sign (a stop line and a road arrow, etc.) and a dividing line. Based on dividing lines, the camera sensor 21 calculates a shape of a lane (a region between two adjacent dividing lines).

The radar sensor 22 is installed at left and right corners of a front end of the own vehicle. The radar sensor 22 emits millimeter-wave band radio waves around the own vehicle (more specifically, in a region from a lateral side to a front side of the own vehicle). When a three-dimensional object is present within the region of the radio wave emission, the radar sensor 22 receives reflected waves from the three-dimensional object. Based on timings of the radio wave emission and reception etc., the radar sensor 22 calculates the relative relationship between the own vehicle and the three-dimensional object. In other words, the radar sensor 22 detects a three dimensional object present around the own vehicle.

The surroundings sensors 20 acquire information on a three-dimensional object obtained by the camera sensor 21 and the radar sensor 22 as surrounding information, and outputs the information to the ECU 10.

The vehicle state sensors 30 include an accelerator pedal (AP) operation amount sensor 31, a vehicle speed sensor 32, an acceleration sensor 33, a steering angle sensor 34, and a turn signal sensor 35. The AP operation amount sensor 31 detects an accelerator pedal (AP) operation amount in response to (corresponding to) an accelerator pedal (AP) operation by the driver. In the present embodiment, a stroke amount of an accelerator pedal is detected as the AP operation amount. However, for example, a stepping speed of the accelerator pedal may also be detected as the AP operation amount in addition to or instead of the stroke amount of the accelerator pedal.

The vehicle speed sensor 32 detects a speed of the own vehicle (vehicle speed). The acceleration sensor 33 detects a front-rear acceleration (acceleration in a front-rear direction) and a lateral acceleration (acceleration in a lateral direction orthogonal to the front-rear direction) of the own vehicle. The steering angle sensor 34 detects a steering angle in response to (corresponding to) steering operation (steering wheel operation) by the driver. In the present embodiment, a steering angle is defined as a positive value when the steering wheel is steered in a clockwise direction, and a steering angle is defined as a negative value when the steering wheel is steered in a counterclockwise direction. The turn signal sensor 35 detects an operating state of a direction indicating operator (turn signal lever WL in the present embodiment) corresponding to a direction indicating operation by the driver. Here, the operating state of the turn signal lever WL includes "the turn signal lever WL is being operated in the right direction (operated to the right)", "the turn signal lever WL is being operated in the left direction (operated to the left)", and "the turn signal lever WL is not being operated".

The values and operating states detected by these sensors 31 to 35 all correspond to examples of "vehicle states". That is, the own vehicle state sensor 30 detects multiple types of vehicle states corresponding to driving operations by the driver. The own vehicle state sensor 30 acquires information on the detected vehicle state as vehicle state information and outputs the information to the ECU 10.

The drive apparatus 40 is an apparatus for applying to driving wheels driving force to run the own vehicle. The ECU 10 controls the driving force applied to the driving wheels by controlling operation of the drive apparatus 40. Note that types of the own vehicle are not particularly limited, and for example, the own vehicle may be an engine vehicle, a hybrid electric vehicle (HEV), a plug-in hybrid electric vehicle (PHEV), a fuel cell electric vehicle (FCEV), a battery electric vehicle (BEV), or the like.

The braking apparatus 50 is an apparatus for applying to its wheels braking force to brake the own vehicle. The ECU 10 controls the braking force applied to the wheels by controlling operation of the braking apparatus 50.

The steering apparatus 60 is an apparatus for applying to a steering mechanism (not shown) a steering torque to steer steered wheels of the own vehicle. The ECU 10 controls the steering torque applied to the steering mechanism by controlling operation of the steering apparatus 60.

The ECU 10 executes deceleration assist control when each of predetermined start conditions is satisfied. The start conditions vary depending on a type of a three-dimensional object to be controlled by the deceleration assist control (hereinafter, this object may also be referred to as a "control target") and a type of a situation in which the deceleration assist control is required (hereinafter, this situation may also referred to as a "control situation"). A specific description will be given below.

A start condition 1, which is a start condition for a case where the control target is a preceding vehicle, is satisfied when the following conditions 1a to 1c are satisfied.
 (Condition 1a) A preceding vehicle is detected.
 (Condition 1b) A vehicle speed v of the own vehicle is greater than a vehicle speed of the preceding vehicle.
 (Condition 1c) TTC for the control target is equal to or less than a predetermined threshold TTCth.

Here, TTC is an abbreviation for Time To Collision, and indicates an expected time required for the own vehicle to collide with (reach) the control target. The TTC can be calculated by dividing a distance to the control target by a relative speed of the own vehicle with respect to the control target. When the start condition 1 is satisfied, the ECU 10 sets a target vehicle speed vtgt to the vehicle speed of the preceding vehicle and executes the deceleration assist control so that the vehicle speed becomes v=vtgt (in other words, so that the relative speed becomes zero) at a position backward from the preceding vehicle by a certain distance d1.

A start condition 2, which is a start condition for a case where the control target is a "signal with a red light display" or a "road sign requiring the own vehicle to come to a temporary stop," is satisfied when the following conditions 2a and 2b are satisfied. (Hereinafter, the above-mentioned signal is also simply referred to as a "red signal," and the above-mentioned road sign is also simply referred to as a "temporary stop sign.")
 (Condition 2a) A red signal or a temporary stop sign is detected.
 (Condition 2b) The TTC for the control target is less than or equal to a predetermined threshold TTCth.

When the start condition 2 is satisfied, the ECU 10 sets the target vehicle speed vtgt to zero and executes the deceleration assist control so that the vehicle speed becomes v=vtgt at a position backward from the red signal or the temporary stop sign by a certain distance d2 (typically, at a position of a stop line). Note that the threshold TTCth in the condition 1c and the TTCth in the condition 2b may be the same or different.

A start condition 3, which is a start condition for a case where the control situation is "pre-right/left turn at an intersection," is satisfied when all of the following conditions 3a to 3c are satisfied. Here, the "pre-right/left turn at an intersection" means that the own vehicle is traveling with an intention of turning right or left at an intersection ahead of the own vehicle.
 (Condition 3a) An intersection (signal or intersection sign) is detected.
 (Condition 3b) The turn signal lever WL is operated in the left direction and a left lateral distance dll (described later) is less than or equal to a predetermined distance threshold dlth, or the turn signal lever WL is operated in the right direction and a right lateral distance dlr (described later) is less than or equal to a predetermined distance threshold dlth.
 (Condition 3c) The vehicle speed v is greater than a predetermined recommended vehicle speed vr1 (described later).

The left lateral distance dll and the right lateral distance dlr in the condition 3b are distances in a lane width direction from the own vehicle to structures on the left and right, respectively. The distance threshold dlth can be set in advance based on a maximum value of the left lateral distance dll (or right lateral distance dlr) of when the own vehicle is traveling on a leftmost (or rightmost) lane. Additionally, the recommended vehicle speed r1 in the condition 3c is a vehicle speed recommended to achieve a safe right or left turn at an intersection. When the conditions 3a to 3c are satisfied, there is a high possibility that the own vehicle is traveling on the leftmost or rightmost lane to make a left or right turn at the intersection. When the start condition 3 is satisfied, the ECU 10 sets the recommended vehicle speed vr1 as the target vehicle speed vtgt and executes the deceleration assist control so that the vehicle speed becomes v=vtgt at a position backward from the intersection by a certain distance d3. Note that when a road arrow (strictly, a road arrow indicating a traveling direction corresponding to an operating direction of the turn signal lever WL) is detected by the camera sensor 21, it is considered more likely that the own vehicle has the intention to make a right or left turn at the intersection compared to when the road arrow is not detected. Therefore, in such a case, the ECU 10 may be configured to increase a magnitude of deceleration by the deceleration assist control.

A start condition 4, which is a start condition for a case where the control situation is "when traveling on a curved road", is satisfied when both of the following conditions 4a and 4b are satisfied.
   (Condition 4a) A lateral acceleration Gl of the own vehicle exceeds a predetermined lateral acceleration threshold Glth.
   (Condition 4b) The vehicle speed v is higher than a predetermined recommended vehicle speed vr2 (described later).

The lateral acceleration threshold Glth in the condition 4a is a value that can determine whether a traveling lane of the own vehicle is curved or straight, and can be set in advance based on a distribution data of lateral acceleration Gl of when traveling at a vehicle speed within a predetermined speed range on a lane with various curvatures. The recommended vehicle speed vr2 in the condition 4b is a vehicle speed recommended to achieve a safe traveling on a curved road. The recommended vehicle speed vr2 may be a variable value depending on the curvature of the curved road. When the start condition 4 is satisfied, the ECU 10 sets the recommended vehicle speed vr2 as the target vehicle speed vtgt and executes the deceleration assist control at a deceleration within a predetermined deceleration range so that the vehicle speed becomes v=vtgt.

Figure 2:
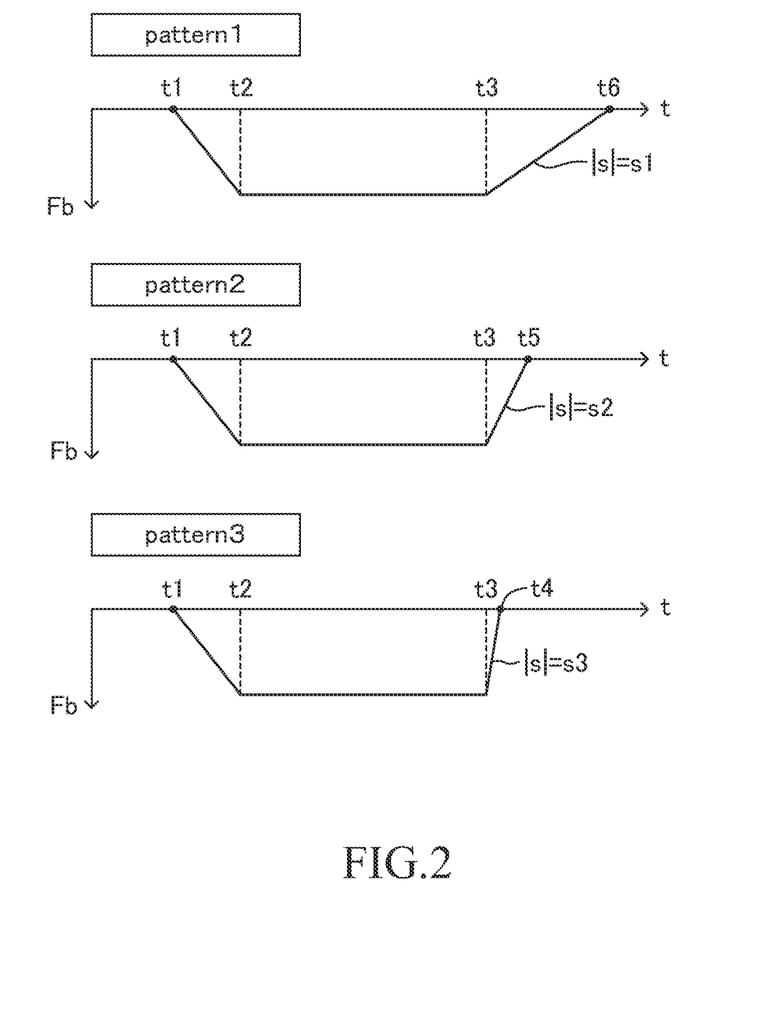
FIG. 2 is a diagram showing behaviors of braking force when a cancel condition is satisfied in a case where an absolute value of a decrease slope of the braking force is set to s1, s2, and s3.

A cancel condition for the deceleration assist control is satisfied when the AP operation is performed by the driver during execution of the control. When the cancel condition is satisfied, the ECU 10 cancels the deceleration assist control by reducing the braking force (strictly, a magnitude of the braking force) so that the deceleration of the own vehicle becomes zero. At this time (when the cancel condition is satisfied), the ECU 10 sets a decrease slope (strictly, an absolute value of a decrease slope) of the braking force based not only on the AP operation amount but also on the surrounding information and the vehicle state information, and reduces the braking force according to the set decrease slope. FIG. 2 shows setting patterns of the absolute values |s|s of the decrease slopes of the braking force. A horizontal axis of a graph in FIG. 2 represents time t, and a vertical axis represents the braking force Fb. In the graph of FIG. 2, the deceleration assist control has been started at time t1 in all cases. The braking force increases linearly from time t1 to time t2, and is maintained at a constant value from time t2 to time t3. At time t3, the cancel condition is satisfied, and the braking force decreases linearly at a predetermined decrease slope in each pattern. The absolute value |s| of the decrease slope is set to s1, s2, and s3 in the patterns 1, 2, and 3, respectively. s1 to s3 are values set in advance based on experiments or simulations, and a relationship of s1<s2<s3 is satisfied. With this configuration, the braking force decreases most gently (taking time) in the pattern 1 and most sharply (quickly) in the pattern 3 (t4<t5<t6).

Figure 3:
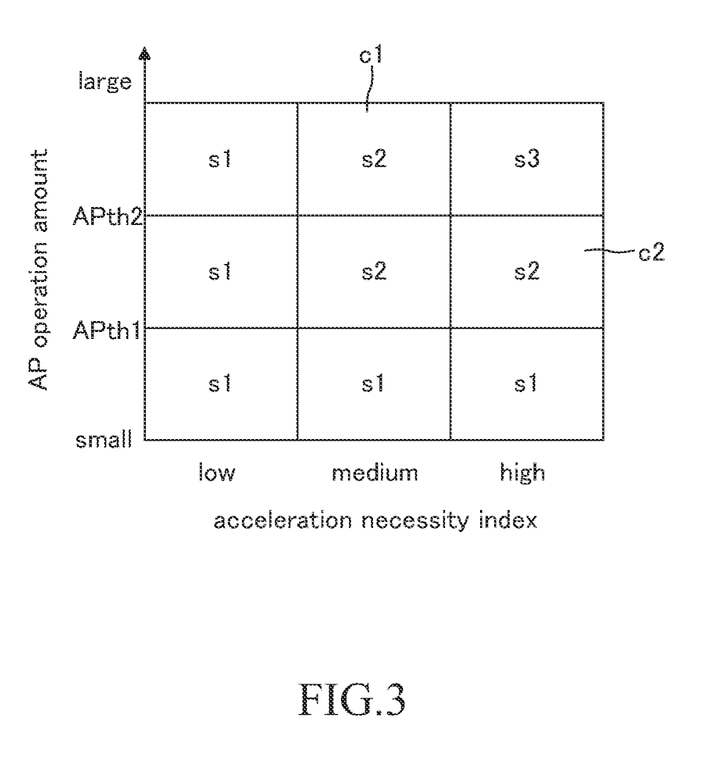
FIG. 3 is a diagram showing a matrix of absolute values of the decrease slope of the braking force.

When the cancel condition is satisfied, the ECU 10 calculates an acceleration necessity index. The acceleration necessity index is an index indicating a degree of necessity of accelerating the own vehicle and is classified into three levels: low, medium, and high (described later) in the present embodiment. Based on the acceleration necessity index and the AP operation amount, the ECU 10 sets the absolute value |s| of the decrease slope of the braking force as shown in the matrix of FIG. 3. According to this matrix, when the acceleration necessity index is "low", the absolute value |s| of the decrease slope is set to s1 regardless of a value of the AP operation amount. On the other hand, in a case where the acceleration necessity index is "high", when the AP operation amount is equal to or less than a predetermined first threshold APth1, |s| is set to s1, when the AP operation amount is greater than the first threshold APth1 and equal to or less than a predetermined second threshold APth2 (>APth1), |s| is set to s2, and when the AP operation amount is greater than the second threshold APth2, |s| is set to s3. That is, when the acceleration necessity index is "high", the absolute value |s| of the decrease slope is set to gradually larger values with an increase in the AP operation amount. In contrast, in a case where the acceleration necessity index is "medium", when the AP operation amount is equal to or less than the first threshold APth1, |s| is set to s1, and when the AP operation amount is greater than the first threshold APth1, |s| is set to s2. With this configuration, the decrease slope of the braking force becomes gradually steeper with an increase in the AP operation amount in a scene where the acceleration necessity index is high, while the braking force is reduced gently in a scene where the acceleration necessity index is low. Therefore, it is possible to reduce a possibility of the driver feeling uncomfortable when canceling the deceleration assist control and to cancel the deceleration assist control in a manner that better matches with the driver's sense.

When the cancel condition is satisfied, the ECU 10 cancels the deceleration assist control and executes an acceleration override based on the AP operation amount. The acceleration override is control that controls the driving force so that the acceleration of the own vehicle matches a requested acceleration by the driver's AP operation.

The value s2 corresponds to an example of a "reference slope." In the present embodiment, the value s2 is equivalent to an absolute value of a decrease slope set when the AP operation amount is moderate (i.e., APth1<AP operation amount≤APth2) in a conventional driving support apparatus (that is, an apparatus configured to reduce the braking force based only on the AP operation amount when canceling the deceleration assist control).

In addition, the absolute value |s| of the decrease slope for each cell in the matrix is not limited to the setting shown in FIG. 3. For example, in cells c1 and c2, |s| may be set to s3 instead of s2.

Next, the acceleration necessity index will be described. A method for determining a type of the acceleration necessity index differs depending on a type of a control target and a type of a control situation. A specific description is given below. Note that calculation of the acceleration necessity index is performed during execution of the deceleration assist control, and so descriptions on self-evident conditions (such as a condition that the control target is detected) are omitted unless specifically necessary.

Figure 4:
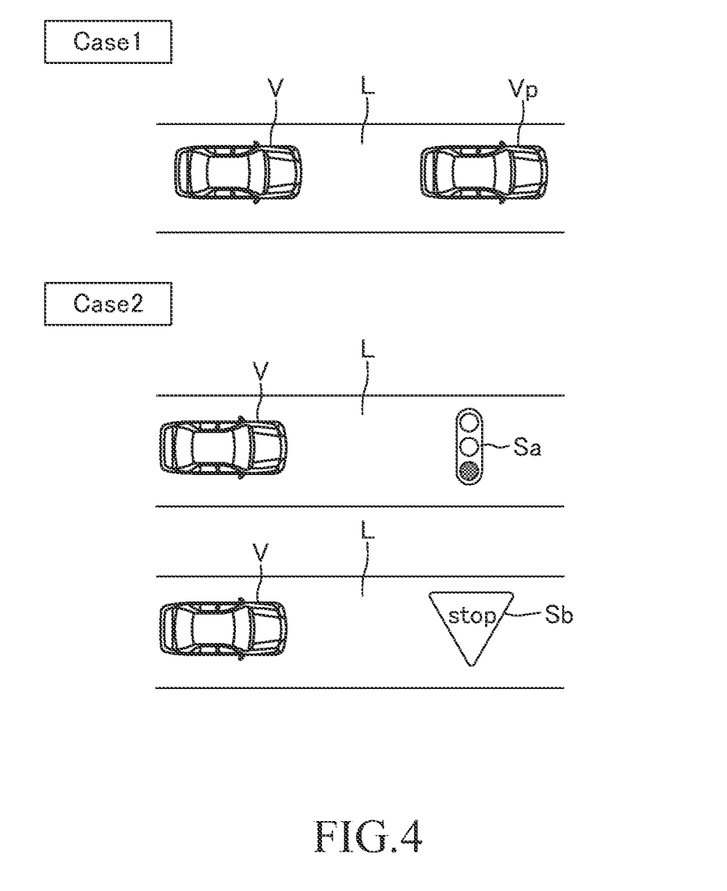
FIG. 4 is a diagram showing examples of a scene where the acceleration necessity index is low.

1. In a Case where the Control Target is a Preceding Vehicle
   When the following condition 1d is satisfied, the ECU 10 determines that the acceleration necessity index is "low" (i.e., the acceleration necessity index is low). The condition 1d is satisfied when conditions 1d-1 to 1d-3 are all satisfied.
   (Condition 1d)
      (Condition 1d-1) TTC for the control target is equal to or less than a predetermined first TTC threshold TTCth1.
      (Condition 1d-2) A magnitude of the steering angle θ is equal to or less than a first steering angle threshold value θth1.
      (Condition 1d-3) The turn signal lever WL is not operated.
   Note that the first threshold TTCth1 satisfies TTCth1<TTCth.
   Case 1 in FIG. 4 shows a scene where the deceleration assist control is being executed with a preceding vehicle Vp being set as the control object. A symbol L represents a traveling lane. At this point, although the deceleration assist control is being executed, an inter-vehicular distance from the own vehicle to the preceding vehicle Vp is still relatively short, and the vehicle speed v is greater than a vehicle speed vp (a vehicle speed of the preceding vehicle Vp), and thus TTC≤TTCth1 holds. Also, the steering angle θ≤the first steering angle threshold θth1 holds, and the turn signal lever WL is not operated. In this scene, if the driver mistakenly steps on the accelerator pedal with an intention of stepping on the brake pedal in order to secure the inter-vehicular distance, the cancel condition is satisfied, and hence the ECU 10 calculates the acceleration necessity index. In the case 1, all of the conditions 1d-1 to 1d-3 are satisfied. Therefore, the ECU 10 determines that the acceleration necessity index is "low". In this case, the decrease slope |s| of the braking force is set to s1 regardless of the value of the AP operation amount, and thus the braking force decreases gradually (gently) (a deceleration feeling decreases gradually). Therefore, even if the AP operation amount increases contrary to the driver's intention due to misoperation of the pedals, it is possible to reduce the possibility of the driver feeling uncomfortable.

In addition, when any of the following conditions 1e, 1f, or 1g is satisfied, the ECU 10 determines that the acceleration necessity index is "high". The condition 1f is satisfied when all of conditions 1f-1 to 1f-3 are satisfied. The condition 1g is satisfied when all of conditions 1g-1 to 1g-3 are satisfied.

(Condition 1e) TTC for the control target exceeds a predetermined second threshold TTCth2. Note that the second threshold TTCth2 satisfies TTCth1<TTCth2<TTCth. "when the condition 1e is satisfied" corresponds to an example of a "first case".

(Condition 1f)
(Condition 1f-1) No preceding vehicle is detected.
(Condition 1f-2) The magnitude of the steering angle θ is equal to or less than the first steering angle threshold θth1.
(Condition 1f-3) The turn signal lever WL is not operated.

Note that "when the condition 1f is satisfied" corresponds to an example of a "second case."

Figure 5:
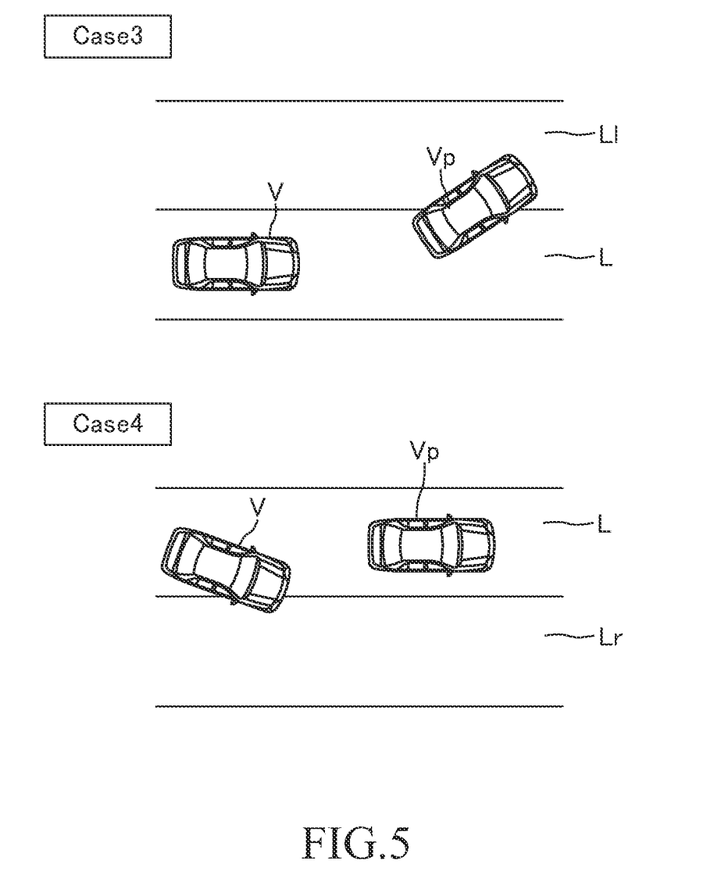
FIG. 5 is a diagram showing examples of a scene where the acceleration necessity index is high.

Case 3 in FIG. 5 shows a scene where the deceleration assist control is being executed as a result of the own vehicle V traveling relatively fast on the traveling lane L. The vehicle Vp traveling in front of the own vehicle V is trying to change lanes to an adjacent lane Ll because the own vehicle V is approaching from behind. When a vehicle that was traveling in front of the own vehicle V starts to depart from the traveling lane, the ECU 10 is configured not to detect the vehicle. Therefore, in the case 3, no preceding vehicle is detected. Note that the preceding vehicle may be defined as a vehicle having a distance from the own vehicle that is equal to or less than a predetermined distance threshold di. In the case 3, the steering angle θ≤the first steering angle threshold θth1 is satisfied, and the turn signal lever WL is not operated. In this scene, when the driver depresses the accelerator pedal for a purpose of accelerating the own vehicle V, the cancel condition is satisfied, and thus the ECU 10 calculates the acceleration necessity index. In the case 3, all of the conditions 1f-1 to 1f-3 are satisfied. Therefore, the ECU 10 determines that the acceleration necessity index is "high". In this case, the decrease slope |s| of the braking force increases gradually in response to the AP operation amount (see FIG. 3). As a result, the driver can obtain a deceleration feeling corresponding to the driver's own AP operation. Consequently, a smooth acceleration override can be achieved.

(Condition 1g)
(Condition 1g-1) A preceding vehicle is detected.
(Condition 1g-2) The magnitude of the steering angle θ exceeds the second steering angle threshold θth2.
(Condition 1g-3) The turn signal lever WL is operated in a direction corresponding to the steering operation.

Note that the second steering angle threshold θth2 is greater than the first steering angle threshold θth1. "When the condition 1g is satisfied" corresponds to an example of a "third case".

Case 4 in FIG. 5 shows a scene where the deceleration assist control is being executed as a result of the own vehicle V traveling relatively fast on the traveling lane L. In this scene, when the driver depresses the accelerator pedal for a purpose of overtaking the preceding vehicle Vp, the cancel condition is satisfied, and thus the ECU 10 calculates the acceleration necessity index. Before depressing the accelerator pedal, the driver operates the turn signal lever WL to the right direction and performs the steering operation to the right. Therefore, in the case 4, all of the conditions 1g-1 to 1g-3 are satisfied. Accordingly, the ECU 10 determines that the acceleration necessity index is "high". Hence, similar to the case 3, the driver can obtain the deceleration feeling corresponding to the driver's own AP operation. As a result, a smooth acceleration override can be realized.

In contrast, when none of the conditions 1d to 1g are satisfied at a time of satisfaction of the cancel condition, the ECU 10 determines that the acceleration necessity index is "medium".

2. In a Case where the Control Target is a Red Signal or a Temporary Stop Sign

When the following condition 2d is satisfied, the ECU 10 determines that the acceleration necessity index is "low".

(Condition 2d) TTC for the control target is equal to or less than the first threshold value TTCth1.

Case 2 in FIG. 4 shows a scene where the deceleration assist control is being executed with a red signal Sa or a temporary stop sign Sb being set as the control target. The symbol L represents the traveling lane. At this point, TTC≤TTCth1 is satisfied. In this scene, when the driver mistakenly depresses the accelerator pedal instead of the brake pedal to slow down the own vehicle V, the cancel condition is satisfied, and thus the ECU 10 calculates the acceleration necessity index. In the case 2, since the condition 2d is satisfied, the ECU 10 determines that the acceleration necessity index is "low". In this case, similar to the case 1, even if the AP operation amount due to the misoperation of the pedals becomes large contrary to the driver's intention, the possibility of the driver feeling uncomfort can be reduced.

Besides, the ECU 10 determines that the acceleration necessity index is "medium" when the following condition 2e is satisfied, and that the acceleration necessity index is "high" when the condition 2f is satisfied.

(Condition 2e) TTC for the control target exceeds the first threshold value TTCth1 and is less than or equal to the second threshold value TTCth2.

(Condition 2f) TTC for the control target exceeds the second threshold value TTCth2.

3. In a Case where the Control Situation is "Pre-Right/Left Turn at an Intersection The ECU 10 calculates an expected time required for the own vehicle to reach the intersection as TTC. The ECU 10 determines that the acceleration necessity index is "low"

when TTC≤TTCth1, that the acceleration necessity index is "medium" when TTCth1<TTC≤TTCth2, and that the acceleration necessity index is "high" when TTCth2<TTC.

4. In a Case where the Control Situation is "when Traveling on a Curved Road"

It is considered that a need for acceleration decreases as a lateral acceleration Gl of when the own vehicle is traveling on a curve road increases. Therefore, the ECU 10 determines that the acceleration necessity index is "high" when the lateral acceleration Gl is less than or equal to a predetermined first lateral acceleration threshold Glth1. The ECU 10 determines that the acceleration necessity index is "medium" when the lateral acceleration Gl exceeds the first lateral acceleration threshold Glth1 and is less than or equal to a predetermined second lateral acceleration threshold Glth2 (>Glth1). Furthermore, the ECU 10 determines that the acceleration necessity index is "low" when the lateral acceleration Gl exceeds the second lateral acceleration threshold value Glth2. Note that both the first and second lateral acceleration thresholds Glth1 and Glth2 are greater than Glth.

Next, a specific operation of the ECU 10 will be described. The CPU of the ECU 10 executes a routine shown in a flowchart of FIG. 6 during a period in which an ignition switch is on. At a predetermined timing, the CPU proceeds with processing from step 600 to step 605 and determines whether or not the deceleration assist control is being executed based on satisfaction of any one of the start conditions 1 to 4. When the deceleration assist control is not being executed (S605: No), the CPU proceeds with processing to step 695 and temporarily terminates the present routine. On the other hand, when the deceleration assist control is being executed (S605: Yes), the CPU proceeds with processing to step 610.

Figure 6:
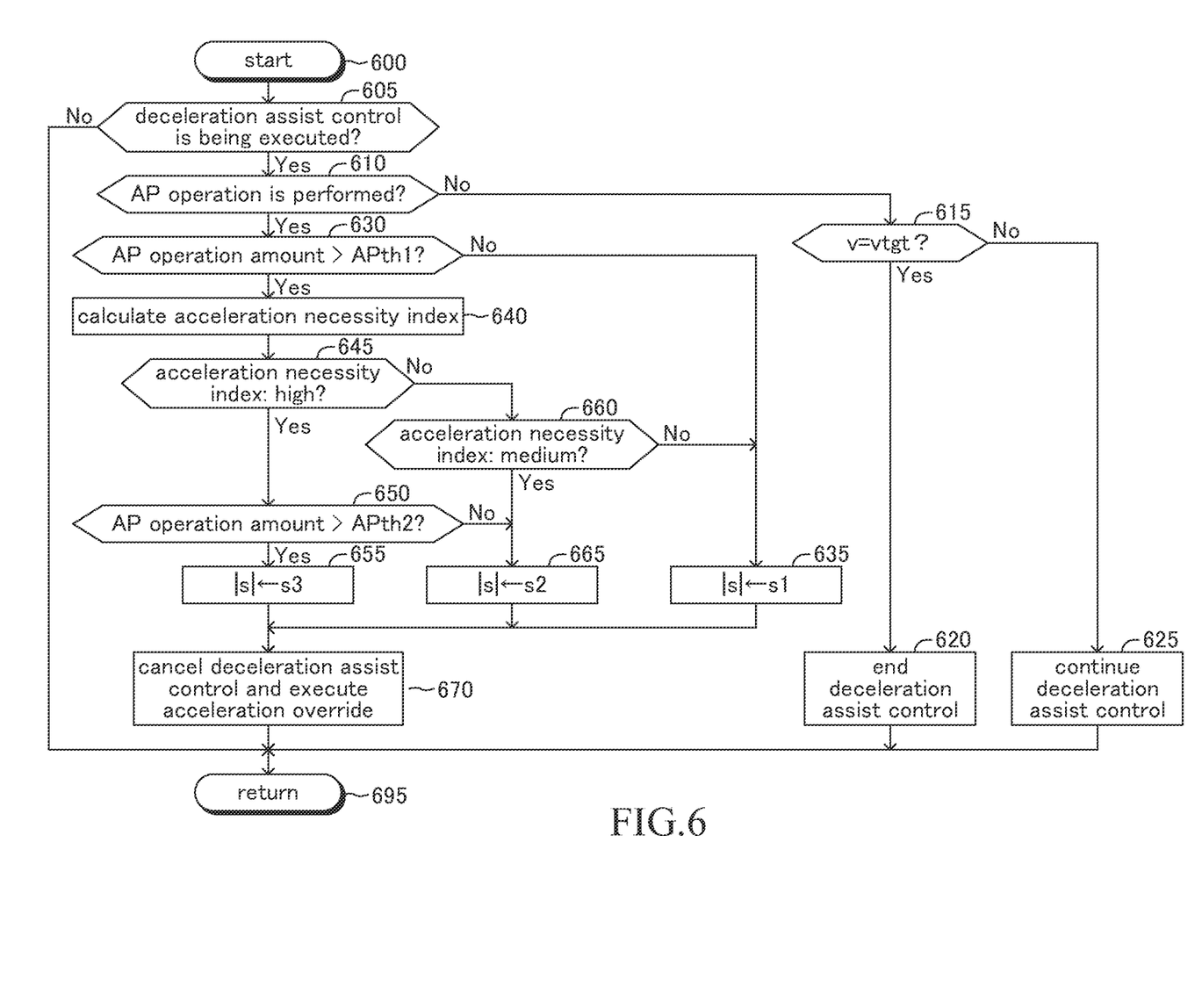
FIG. 6 is a flowchart showing a routine executed by CPU of driving support ECU.

In step 610, the CPU determines whether or not the AP operation is performed by the driver based on the vehicle state information (information on the AP operation amount detected by the AP operation amount sensor 31). When the AP operation is not performed (S610: No), the CPU proceeds with processing to step 615 and determines whether the vehicle speed v is equal to the target vehicle speed vtgt. When v=vtgt (S615: Yes), the CPU proceeds with processing to step 620 to end the deceleration assist control. On the other hand, when v>vtgt (S615: No), the CPU proceeds with processing to step 625 to continue the deceleration assist control. After the processing of steps 620 or 625 is completed, the CPU proceeds with processing to step 695 to temporarily terminate the present routine.

In contrast, when the AP operation is performed (S610: Yes), the CPU proceeds with processing to step 630 to determine whether the AP operation amount is greater than the first threshold value APth1. When the AP operation amount is less than or equal to APth1 (S630: No), the CPU proceeds with processing to step 635 to set the absolute value |s| of the decrease slope of the braking force to s1. On the other hand, when the AP operation amount is greater than APth1 (S630: Yes), the CPU proceeds with processing to step 640.

In step 640, the CPU calculates the acceleration necessary index based on the surrounding and the vehicle state information. Then, the CPU proceeds with processing to step 645 and determines whether the acceleration necessity index is "high" or not. When the acceleration necessity index is "high" (S645: Yes), the CPU proceeds with processing to step 650 to determine whether the AP operation amount is greater than the second threshold APth2. When the AP operation amount is greater than APth2 (S650: Yes), the CPU proceeds with processing to step 655 and sets the absolute value |s| of the decrease slope of the braking force to s3. On the other hand, when the AP operation amount is less than or equal to APth2 (S650: No), the CPU proceeds with processing to step 665 and sets the absolute value |s| of the decrease slope of the braking force to s2.

In contrast, when the acceleration necessity index is not "high" (step 645: No), the CPU proceeds with processing to step 660 and determines whether the acceleration necessity index is "medium" or not. When the acceleration necessity index is "medium" (S660: Yes), the CPU proceeds with processing to the aforementioned step 665. On the other hand, when the acceleration necessity index is not "medium" (i.e., the acceleration necessity index is "low") (S660: No), the CPU proceeds with processing to step 635 mentioned above.

After the processing of steps 635, 655, or 665 is finished, the CPU proceeds with processing to step 670 and cancels the deceleration assist control by decreasing the braking force at the set decrease slope. In addition, based on the AP operation amount detected in step 610, the CPU executes the acceleration override. After that, the CPU terminates the present routine at step 695.

While the driving support apparatus according to the embodiment described above has been described, the present invention is not limited to the above embodiment and various modifications are possible as long as they do not deviate from a scope of the present invention.

For example, whether to perform "control to change the absolute value |s| of the decrease slope based on the AP operation amount and the acceleration necessity index" may be configured to be selectable by the driver's operation (typically, touch panel operation or switch operation). This configuration is particularly useful when the driver tends not to want intervention of the above control (that is, desires a vehicle behavior corresponding to the AP operation amount).

In addition, in the above embodiment, when the acceleration necessity index is high and the AP operation amount is greater than APth2 (S650: Yes), the absolute value |s| of the decrease slope is set uniformly to s3 (a slope that sharply reduces the braking force), but the present invention is not limited to this configuration. In a case where a relatively large braking force is being applied by the deceleration assist control (in other words, when the magnitude of deceleration is relatively large), when the braking force is sharply reduced, there is a possibility that the deceleration fluctuates widely and the driver feels uncomfortable. Therefore, the driving support apparatus may be configured to set, in a case of "S650: Yes", the absolute value |s| of the decrease slope to a value smaller than s3 (for example, s2) when (the magnitude of) the braking force applied to the own vehicle at a current time point (i.e., at a time point when the AP operation is performed) is greater than a predetermined braking force threshold. According to this configuration, when the braking force is relatively large in a case of "S650: Yes", the braking force decreases relatively gently. Therefore, an occurrence of wide fluctuations in the deceleration can be suppressed, and as a result, the possibility of the driver feeling uncomfortable can be reduced. Note that the present invention is also applicable to automated driving vehicles.

What is claimed is:

1. A driving support apparatus comprising:
   a surrounding sensor capable of detecting a three-dimensional object present around a vehicle and a road marking in front of the vehicle, and acquiring information on the detected three-dimensional object and road marking as surrounding information;

a vehicle state sensor capable of detecting multiple types of vehicle states in response to driving operation by a driver of the vehicle, and acquiring information on the detected vehicle states as vehicle state information, including an accelerator pedal operation amount in response to an accelerator pedal operation by the driver, a vehicle speed of the vehicle, a steering angle in response to a steering operation by the driver, and an operating state of a direction indicating operator corresponding to a direction indicating operation by the driver; and a control unit which performs:
  start condition determination processing which determines whether the start condition is satisfied, the start condition being satisfied when (i) a preceding vehicle is detected, (ii) a vehicle speed of the vehicle is greater than a vehicle speed of the preceding vehicle, and (iii) a time to collision (TTC) with the preceding vehicle is equal to or less than a predetermined time threshold (TTCth);
  execution processing which executes deceleration assist control that assists deceleration of the vehicle by automatically applying a braking force to the vehicle when the start condition is satisfied; and
  cancel processing which cancels the deceleration assist control by decreasing the braking force so that a deceleration of the vehicle becomes zero when a cancel condition is satisfied, the cancel condition being satisfied when the accelerator pedal operation is performed during execution of the deceleration assist control, wherein when the cancel condition is satisfied, the control unit performs:
  first acceleration necessity index determination processing which determines whether an acceleration necessity index, which indicates a degree of necessity of accelerating the vehicle, is low, the acceleration necessity index being determined to be low when the TTC is less than or equal to a predetermined first time threshold (TTCth1) that is smaller than the TTCth, a magnitude of the steering angle is less than or equal to a predetermined first steering angle threshold, and the direction indicating operator is not operated; and
  first set processing which sets, when the acceleration necessity index is low, an absolute value of a decrease slope of the braking force smaller than a predetermined reference slope regardless of a value of the accelerator pedal operation amount.

2. The driving support apparatus according to claim 1, wherein,
  the control unit performs:
    second acceleration necessity index determination processing which determines whether the acceleration necessity index is high, the acceleration necessity index being determined to be high when the TTC exceeds a predetermined second time threshold (TTCth2) that is larger than the TTCth1 and smaller than the TTCth; and
    second set processing which sets, when the acceleration necessity index is high, the absolute value of the decrease slope being larger as the accelerator pedal operation amount increases.

3. The driving support apparatus according to claim 1, wherein,
  the control unit performs:
    second acceleration necessity index determination processing which determines whether the acceleration necessity index is high, the acceleration necessity index being determined to be high when there is no preceding vehicle, a magnitude of the steering angle is less than or equal to a predetermined first steering angle threshold, and the direction indicating operator is not operated, and
    second set processing which sets, when the acceleration necessity index is high, the absolute value of the decrease slope larger as the accelerator pedal operation amount increases.

4. The driving support apparatus according to claim 1, wherein,
  the control unit performs:
    second acceleration necessity index determination processing which determines whether the acceleration necessity index is high, the acceleration necessity index being determined to be high when there is a preceding vehicle, the magnitude of the steering angle exceeds a predetermined second steering angle threshold larger than the first steering angle threshold, and the direction indicating operator is operated in a direction corresponding to the steering operation, and
    second set processing which sets, when the acceleration necessity index is high, the absolute value of the decrease slope larger as the accelerator pedal operation amount increases.

5. A driving support apparatus comprising:
  a surrounding sensor configured to detect a three-dimensional object present around a vehicle and a road marking in front of the vehicle, and acquire information on the detected three-dimensional object and road marking as surrounding information;
  a vehicle state sensor configured to detect multiple types of vehicle states in response to a driving operation by a driver of the vehicle, and acquire information on the detected vehicle states as vehicle state information, including an accelerator pedal operation amount in response to an accelerator pedal operation by the driver, and a vehicle speed of the vehicle; and
  a control unit which performs:
    start condition determination processing which determines whether the start condition is satisfied, the start condition being satisfied when a red signal or a temporary stop sign is detected, and a time to reach the detected red signal or temporary stop sign (TTC) is equal to or less than a predetermined time threshold (TTCth):
    execution processing which executes deceleration assist control that assists deceleration of the vehicle by automatically applying a braking force to the vehicle when the start condition is satisfied; and
    cancel processing which cancels the deceleration assist control by decreasing the braking force so that a deceleration of the vehicle becomes zero when a cancel condition is satisfied, the cancel condition being satisfied when the accelerator pedal operation is performed during execution of the deceleration assist control,
  wherein when the cancel condition is satisfied, the control unit performs:
    first acceleration necessity index determination processing which determines whether an acceleration necessity index, which indicates a degree of necessity of accelerating the vehicle, is low, the acceleration necessity index being determined to be low when the TTC is equal to or less than a predetermined first time threshold (TTCth1) that is smaller than the TTCth;

second acceleration necessity index determination processing which determines whether the acceleration necessity index is high, the acceleration necessity index being determined to be high when the TTC exceeds a second time threshold (TTCth2) that is larger than the TTCth1 and is smaller than the TTCth;

first set processing which sets, when the acceleration necessity index is low, an absolute value of a decrease slope of the braking force smaller than a predetermined reference slope regardless of a value of the accelerator pedal operation amount; and second set processing which sets, when the acceleration necessity index is high, the absolute value of the decrease slope being larger when the accelerator pedal operation amount increases.

6. A driving support apparatus comprising:

a surrounding sensor configured to detect a three dimensional object present around a vehicle and a road marking in front of the vehicle, and acquire information on the detected three-dimensional object and road marking as surrounding information;

a vehicle state sensor configured to detect multiple types of vehicle states in response to a driving operation by a driver of the vehicle, and acquire information on the detected vehicle states as vehicle state information, including an accelerator pedal operation amount in response to an accelerator pedal operation by the driver, a vehicle speed of the vehicle, and a lateral acceleration of the vehicle; and a control unit which performs:

start condition determination processing which determines whether the start condition is satisfied, the start condition being satisfied when the lateral acceleration of the vehicle exceeds a predetermined lateral acceleration threshold (Glth), and the vehicle speed is higher than a predetermined recommended vehicle speed, the predetermined recommended vehicle speed being a vehicle speed recommended to achieve a safe traveling on a curved road;

execution processing which executes deceleration assist control that assists deceleration of the vehicle by automatically applying a braking force to the vehicle when the start condition is satisfied; and cancel processing which cancels the deceleration assist control by decreasing the braking force so that a deceleration of the vehicle becomes zero when a cancel condition is satisfied, the cancel condition being satisfied when the accelerator pedal operation is performed during execution of the deceleration assist control, wherein when the cancel condition is satisfied, the control unit performs:

first acceleration necessity index determination processing which determines whether an acceleration necessity index, which indicates a degree of necessity of accelerating the vehicle, is low, the acceleration necessity index being determined to be low when the lateral acceleration exceeds a second lateral acceleration threshold (Glth2), the Glth2 being larger than the Glth;

second acceleration necessity index determination processing which determines whether the acceleration necessity index is high, the acceleration necessity index being determined to be high when the lateral acceleration is less than or equal to a first lateral acceleration threshold Glth1 that is smaller than the Glth2;

first set processing which sets, when the acceleration necessity index is low, an absolute value of a decrease slope of the braking force smaller than a predetermined reference slope regardless of a value of the accelerator pedal operation amount; and second set processing which sets, when the acceleration necessity index is high, the absolute value of the decrease slope larger when the accelerator pedal operation amount increases.

* * * * *